(12) United States Patent
Syvain et al.

(10) Patent No.: US 8,082,297 B2
(45) Date of Patent: Dec. 20, 2011

(54) METHOD AND APPARATUS FOR MANAGING COMMUNICATION BETWEEN PARTICIPANTS IN A VIRTUAL ENVIRONMENT

(75) Inventors: Dany Syvain, Gatineau (CA); Nicholas Sauriol, Kanata (CA); Arn Hyndman, Ottawa (CA)

(73) Assignee: Avaya, Inc., Basking Ridge, NJ (US)

( * ) Notice: Subject to any disclaimer, the term of this patent is extended or adjusted under 35 U.S.C. 154(b) by 0 days.

(21) Appl. No.: 12/916,717

(22) Filed: Nov. 1, 2010

(65) Prior Publication Data

US 2011/0047267 A1    Feb. 24, 2011

Related U.S. Application Data

(62) Division of application No. 12/154,719, filed on May 27, 2008, now Pat. No. 7,840,668.

(60) Provisional application No. 60/931,608, filed on May 24, 2007.

(51) Int. Cl.
*G06F 17/00* (2006.01)
*G06F 15/16* (2006.01)

(52) U.S. Cl. ........... 709/203; 709/220; 709/224; 700/94

(58) Field of Classification Search .................. 709/220, 709/227, 238, 245, 224, 228
See application file for complete search history.

(56) References Cited

U.S. PATENT DOCUMENTS

| 5,963,217 | A  | * | 10/1999 | Grayson et al. | 345/473 |
| 6,324,573 | B1 | * | 11/2001 | Rhoads | 709/217 |
| 7,626,569 | B2 | * | 12/2009 | Lanier | 345/156 |
| 2002/0128746 | A1 | * | 9/2002 | Boies et al. | 700/245 |
| 2004/0001065 | A1 | * | 1/2004 | Grayson et al. | 345/473 |
| 2004/0263477 | A1 | * | 12/2004 | Davenport et al. | 345/163 |
| 2008/0234844 | A1 | * | 9/2008 | Boustead et al. | 700/94 |

* cited by examiner

*Primary Examiner* — Khanh Dinh
(74) *Attorney, Agent, or Firm* — Anderson Gorecki & Manaras LLP

(57) ABSTRACT

A method and apparatus for managing communication between participants in a virtual environment enables the participants to elect to automatically connect with each other via a preferred communication mechanism, manually connect with each other, or choose not to connect with each other. The connection may be point-to-point between two participants or may include multiple participants. Establishment of a connection, or the ability to establish a connection, may be based on the proximity of the participants, or the Avatars representing the participants, in the virtual environment. Once the connection is established, the connection may be managed so that the connection is maintained while the Avatars remain proximate each other and is automatically severed once the Avatars move away from each other. Environmental noise and other audio aspects may be included in the connection to simulate a real-world conversation.

18 Claims, 6 Drawing Sheets

Idle

Automatic setup

Manual setup – Step 1

Manual answer – Step 2

Auto Connect Distance

METHOD AND APPARATUS FOR MANAGING COMMUNICATION BETWEEN PARTICIPANTS IN A VIRTUAL ENVIRONMENT

CROSS-REFERENCE TO RELATED APPLICATIONS

This application claims priority to and is a divisional application of U.S. patent application Ser. No. 12/154,719, filed May 27, 2008 now U.S. Pat. No. 7,840,668, which claims priority to U.S. Provisional Patent Application No. 60/931,608, filed May 24, 2007, entitled Communication Management in a Virtual Environment, the content of each of which is hereby incorporated herein by reference.

BACKGROUND OF THE INVENTION

1. Field of the Invention

The present invention relates to virtual environments and, more particularly, to a method and apparatus for managing communication between participants in a virtual environment.

2. Description of the Related Art

Virtual environments simulate actual 3-D environments and allow for many participants to interact with each other and with constructs in the environment via remotely-located clients. One context in which a virtual environment may be used is in connection with gaming, although other uses for virtual environments are also being developed.

In a virtual environment, an actual or fantasy universe is simulated within a computer processor/memory. Multiple players may participate in the virtual environment through a computer network, such as a local area network or a wide area network such as the Internet. Each player selects an "Avatar" which is often a three-dimensional representation of a person or other object to represent them in the virtual environment. Participants send commands to a virtual environment engine that controls the virtual environment to cause their Avatars to move within the virtual environment. In this way, the participants are able to cause their Avatars to interact with other Avatars and other objects in the virtual environment.

A virtual environment often takes the form of a virtual-reality three dimensional map, and may include rooms, outdoor areas, and other representations of environments commonly experienced in the physical world. The virtual environment may also include multiple objects, people, animals, robots, Avatars, robot Avatars, spatial elements, and objects/environments that allow Avatars to participate in activities. Participants establish a presence in the virtual environment via a virtual environment client on their computer, through which they can create or upload an Avatar and then cause the Avatar to "live" within the virtual environment.

As the Avatar moves within the virtual environment, the view experienced by the Avatar changes according to where the Avatar is located within the virtual environment. The views may be displayed to the participant so that the participant controlling the Avatar may see what the Avatar is seeing. The participant may control the Avatar using conventional input devices, such as a computer mouse and keyboard. The inputs are sent to the virtual environment client which forwards the commands to one or more virtual environment servers that are controlling the virtual environment and providing a representation of the virtual environment to the participant via a display associated with the participant's computer.

Depending on how the virtual environment is set up, an Avatar may be able to observe the environment and optionally also interact with other Avatars, modeled objects within the virtual environment, robotic objects within the virtual environment, or the environment itself (i.e. an Avatar may be allowed to go for a swim in a lake or river in the virtual environment). In these cases, client control input may be permitted to cause changes in the modeled objects, such as moving other objects, opening doors, and so forth, which optionally may then be experienced by other Avatars within the virtual environment.

"Interaction" by an Avatar with another modeled object in a virtual environment means that the virtual environment server simulates an interaction in the modeled environment, in response to receiving client control input for the Avatar. Interactions by one Avatar with any other Avatar, object, the environment or automated or robotic Avatars may, in some cases, result in outcomes that may affect or otherwise be observed or experienced by other Avatars, objects, the environment, and automated or robotic Avatars within the virtual environment.

A virtual environment may be created for the user, but more commonly the virtual environment may be persistent, in which it continues to exist and be supported by the virtual environment server even when the user is not interacting with the virtual environment. Thus, where there is more than one user of a virtual environment, the environment may continue to evolve when a user is not logged in, such that the next time the user enters the virtual environment it may be changed from what it looked like the previous time.

Virtual environments are commonly used in on-line gaming, such as for example in online role playing games where users assume the role of a character and take control over most of that character's actions. In addition to games, virtual environments are also being used to simulate real life environments to provide an interface for users that will enable on-line education, training, shopping, and other types of interactions between groups of users and between businesses and users.

When participants encounter each other in the virtual environment, they may desire to communicate with each other, much as people would like to communicate in the real world. The communication may be a simple wave, nod, or other gesture, a simple hello, or optionally the participants may want to converse with each other.

Conventionally, the virtual environments have allowed participants to chat with each other by typing text into a chat bar associated with the view of the virtual environment. Communication management in this type of environment was relatively easy, since the participants could choose to ignore typed messages from other participants. As virtual environments are integrated with other forms of communication, such as Voice over Internet Protocol (VoIP) based audio communication, the communication becomes more intrusive. Additionally, as other forms of communication are integrated with and available through the virtual environment, it will become more important to enable participants in a virtual environment to manage how they are able to communicate with other participants and to enable the participant to manage how other participants are able to initiate communication.

SUMMARY OF THE INVENTION

A method and apparatus for managing communication between participants in a virtual environment enables the participants to elect to automatically connect with each other via a preferred communication mechanism, manually connect with each other, or choose not to connect with each other.

The connection may be point-to-point between two participants or may include multiple participants. Establishment of a connection, or the ability to establish a connection, may be based on the proximity of the participants, or the Avatars representing the participants, in the virtual environment. Once the connection is established, the connection may be managed so that the connection is maintained while the Avatars remain proximate each other and is automatically severed once the Avatars move away from each other. Environmental noise and other audio aspects may be included in the connection to simulate a real-world conversation.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
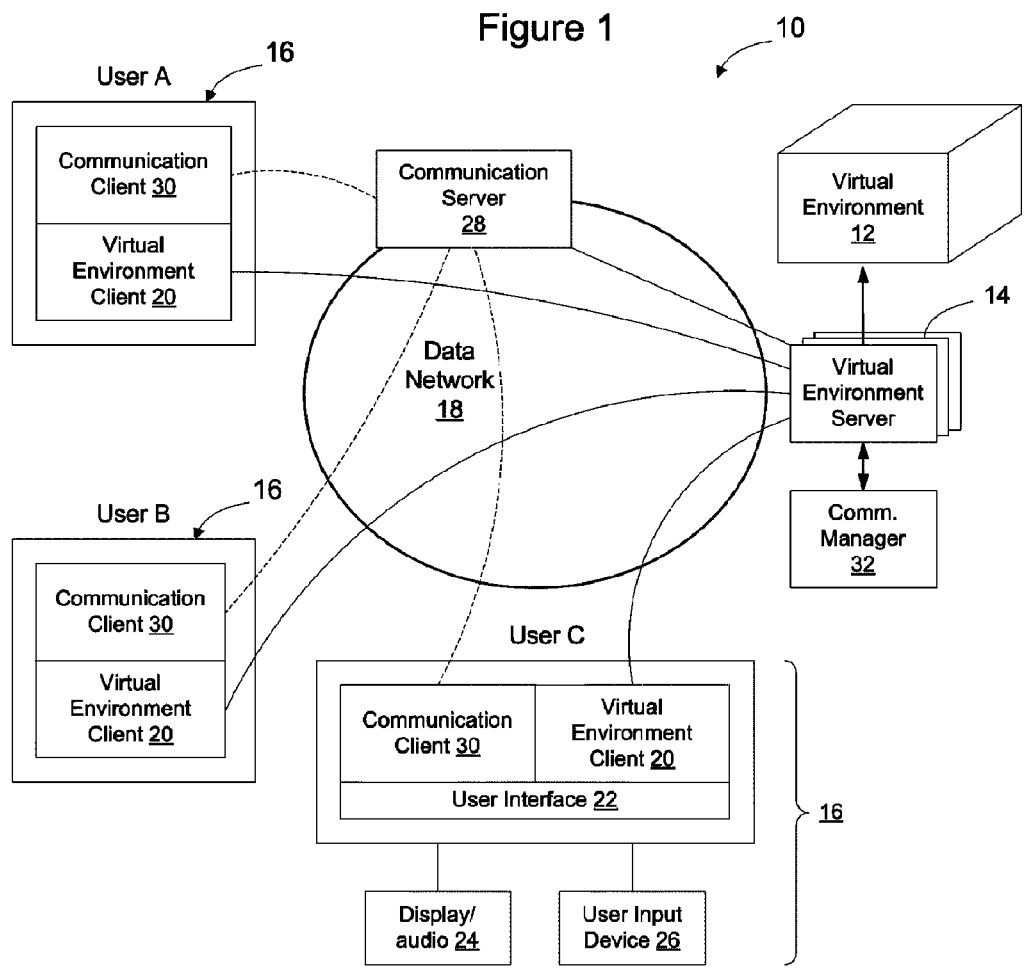
FIG. 1 is a functional block diagram of an example system that may be used to manage communication between participants in a virtual environment according to an embodiment of the invention.

FIG. 1 shows an example system that may be used to manage the communication context of one or more individuals via a virtual environment according to an embodiment of the invention. As shown in FIG. 1, a virtual environment 12 is generally created by one or more virtual environment servers 14. A virtual environment is a three dimensional representation of an environment such as the real world or a fantasy world. The virtual environment servers maintain the virtual environment and generate views of the virtual environment to be presented to participants as they navigate their Avatars through the virtual environment. The virtual environment servers keep track of the location of various Avatars and other objects within the virtual environment.

A virtual environment may be any type of virtual environment, such as a virtual environment created for an on-line game, a virtual environment created to implement an on-line store, a virtual environment created to implement an on-line training facility, or for any other purpose. Virtual environments are being created for many reasons, and may be designed to enable user interaction to achieve a particular purpose. Example uses of virtual environments include gaming, business, retail, training, social networking, and many other aspects.

A participant (such as user A, B, or C in FIG. 1) can use a computer 16 running a virtual environment client 20 and a user interface 22 to access the virtual environment server 14 via a data network 18. The participant may see a representation of a portion of the computer-generated three dimensional virtual environment on a display 24 and input commands via a user input device 26 such as a mouse or keyboard. The user interface generates the output shown on the display under the control of the virtual environment client, and receives the input from the user and passes the user input to the virtual environment client. The virtual environment client passes the user input to the virtual environment server which causes the user's Avatar or other object under the control of the user to execute the desired action in the virtual environment. In this way the user may control a portion of the virtual environment, such as the person's Avatar or other objects in contact with the Avatar, to change the virtual environment for the other users of the virtual environment.

Figure 1A:
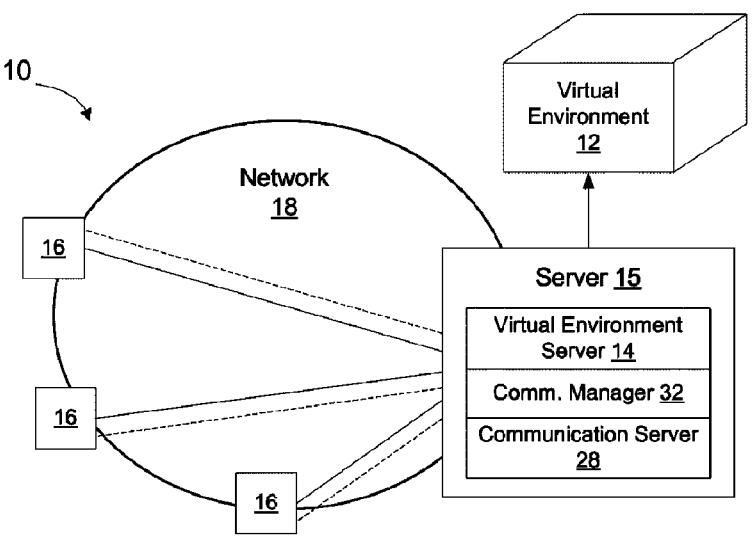
FIG. 1A is a functional block diagram of another example system that may be used to manage communication between participants in a virtual environment according to an embodiment of the invention.

In the embodiment shown in FIG. 1, the virtual environment server 14 is affiliated with a communication server 28 to enable communication sessions to be selectively established between participants in the virtual environment. The communication server may interface with communication clients 30 on the user computers to enable communication sessions to be established between participants. According to an embodiment of the invention, the virtual environment server includes a communication manager 32 that allows participants to manage the establishment, termination, and other aspects of the communication sessions while interacting in the virtual environment. Although the embodiment shown in FIG. 1 has a separate communication server 28, in another embodiment the functions of the communication server may be performed by the communication manager 32, so that the virtual environment server 14 may not only control the establishment of communication sessions between participants, but may also participate in the establishment of the communication sessions. Alternatively, as shown in FIG. 1A, the functions of the communication server, communication manager, and virtual environment server may be implemented as a single server 15. Thus, multiple combinations of functionality may be possible and the invention is not limited to the particular way in which the different functions are allocated between different components of the system.

Figure 2:
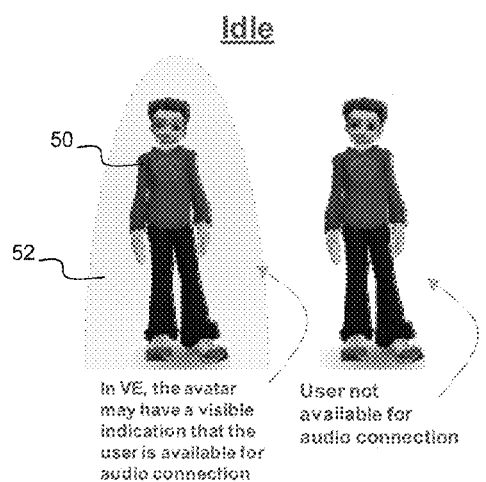
FIGS. 2-11 are example representations of several connection scenarios between Avatars representing participants interacting in a virtual environment.

FIG. 2 shows an example Avatar 50 that may be used to represent a participant in a virtual environment. As shown in FIG. 2, the Avatar has a likeness of a human which is common in virtual environments. According to an embodiment of the invention, a partially translucent communication aura 52 may partially surround the Avatar and be superimposed over the background when the participant associated with the Avatar is willing to engage in communication sessions with other participants. For example, the Avatar on the left in FIG. 2 is shown as superimposed over the partially translucent communication aura 52. The presence of the aura indicates to other participants in the virtual environment that the participant is available for audio communication. The Avatar on the right, by contrast, does not have an aura which indicates to the other participants that the participant associated with the Avatar is not available for audio communication.

The user may control the aura by setting a preference via their User Interface 22 to instruct the communication manager 32 whether they are willing to engage in audio communication sessions with other participants. This preference will be used by the virtual environment server to superimpose the aura around the participant's Avatar when the participant is available, and to remove the aura when the participant is not available. Optionally the appearance of the Aura may be specified by the participant. For example, when a participant creates an character in the virtual environment the participant may be asked to specify many features of their character, such as height, weight, gender, age, hair color, etc. The color and shape of the user's aura may be a feature that the user is able to specify when creating their Avatar, or when deciding to implement the communication option described herein, so that the various aspects of what the aura look like may be customized by the user.

Figure 3:
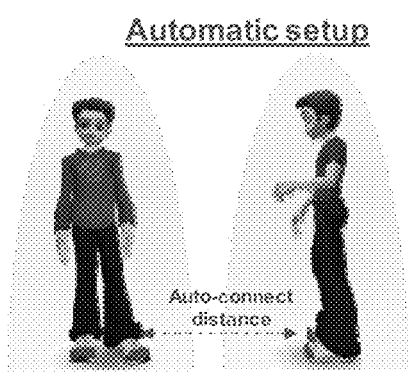

The communication manager 32 may enable communication sessions to be established between participants manually or automatically. FIG. 3 shows a scenario where two Avatars, who have both specified that connection should occur automatically, meet in a virtual environment. As shown in FIG. 3, where both Avatars are set to connect automatically, the distance between the Avatars may be used to control establishment of the audio connection between the participants. The use of distance to enable audio connection simulates the real world, in which people are accustomed to talking with each other while in the same room, but not when separated by a great distance.

Figure 6:
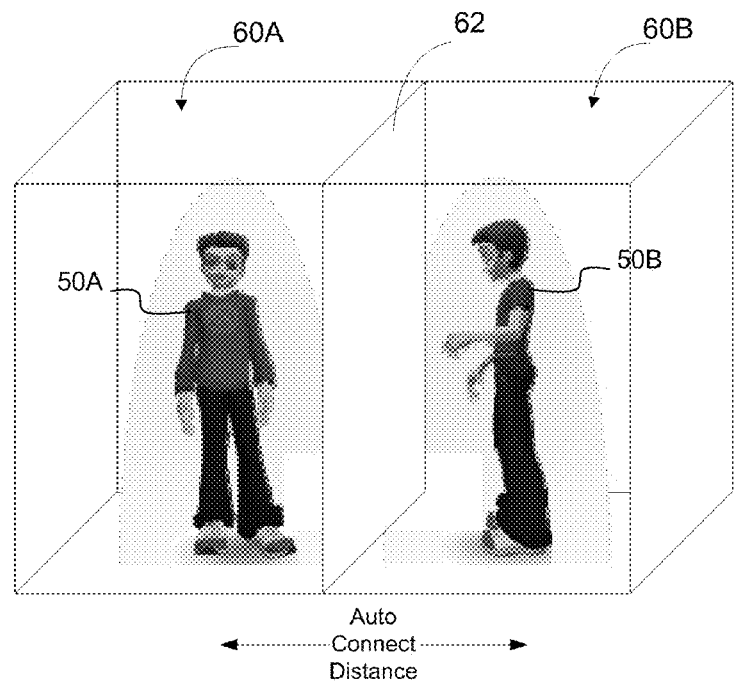
Figure 7:
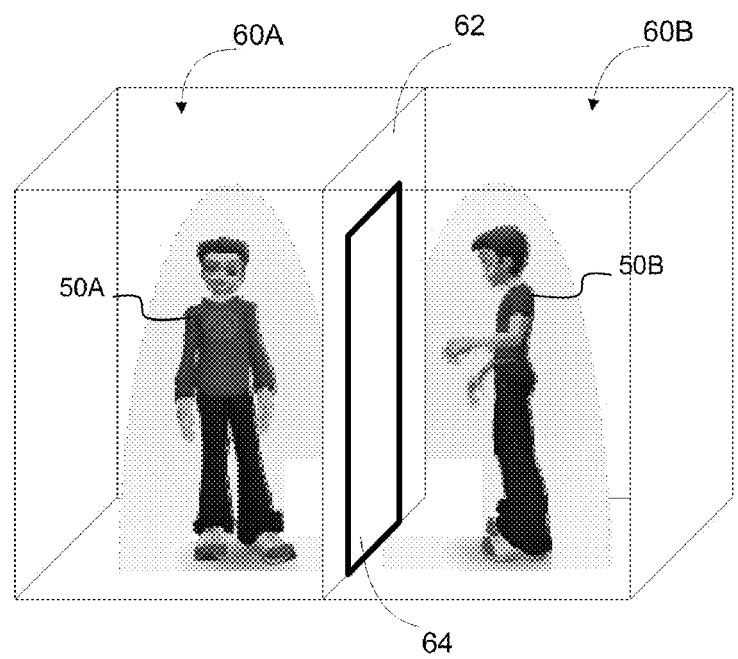

Optionally, the distance between Avatars may be supplemented by other environmental context, such as the location of the Avatars within the virtual environment relative to each other. An example of this is shown in FIG. 6. Specifically, assume that the virtual environment simulates a house or other building that has multiple rooms 60A, 60B. In the real world, people are not generally able to talk to each other through the walls. Thus, in the virtual environment the Avatars may be prevented from establishing an audio connection where the Avatars are on opposite sides of a wall 62 or other barrier in the virtual environment. However, if there is an aperture 64 that would allow voice communication to occur through the wall, such as a door, window, or other aperture (See FIG. 7), the Avatars may be allowed to communicate with each other. Thus, the environmental context may be used in addition to proximity to determine whether the communication manager should establish a communication session between the participants in the virtual environment.

Figure 4:
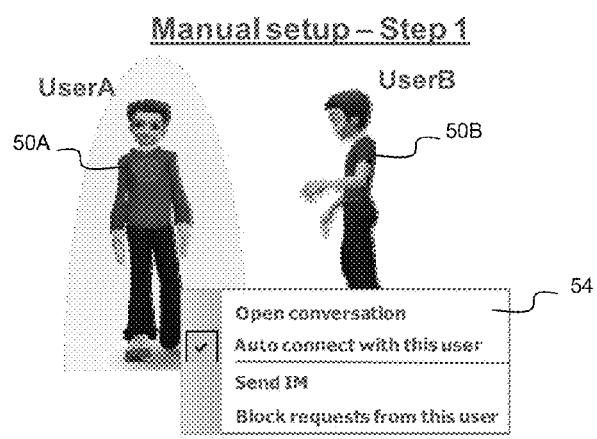
Figure 5:
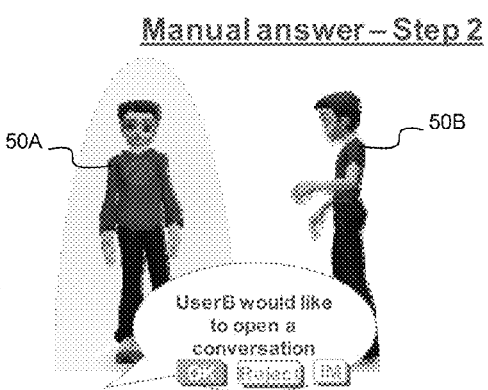

FIGS. 4 and 5 show a process of enabling participants associated with Avatars to communicate manually. As shown in FIG. 4, when an Avatar such as the Avatar 50B associated with a first participant (initiating participant) meets an Avatar associated with another participant (responding participant), the initiating participant (user B in this example) will use their user interface to attempt to communicate with the responding participant. For example, the initiating participant may scroll his mouse over the Avatar of the proposed responding participant and right click on the proposed responding participant. Undertaking this sequence of actions or another sequence of events may cause a dialog box 54 to be presented to the initiating participant via which the initiating participant may specify his preference to establish an audio communication session with the responding participant.

When the initiating participant indicates that a communication session is desired, the responding participant will receive an alert tone or be shown a communication bubble via which the responding participant may accept or decline the proposed audio communication session. If the responding user is set to automatically connect, the responding user will only be provided with an alert tone. Where the user is set to manually connect, the communication bubble may also give the responding participant a way to suggest an alternative communication method such as text/instant messaging option. Although not shown, the communication bubble may also give the responding participant other additional options such as the option of obtaining additional information about the initiating participant. Although a dialog box and a communication bubble were used to show example interfaces that may be provided to the participants, other types of interfaces may be used as well depending on the preferences of the owner running the virtual environment.

If a communication session is declined, the Avatars may continue their activities in the virtual environment as before. However, where the Avatars are both set to automatically connect or where the participants agree to establish a connection, the communication manager and/or the communication server will cause a communication channel to be set up between the initiating and responding participants.

Figure 8:
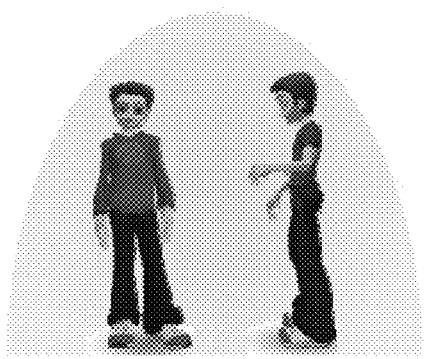

Once a communication channel has been established, it may be desirable to allow other participants in the virtual environment know that the two participants are communicating. Thus, as shown in FIG. 8, once the communication session has been established the virtual environment server may be notified so that the virtual environment server may modify the representation of the Avatars to convey to the other participants in the virtual environment that a conversation is occurring. In the example shown in FIG. 8, this is represented by extending the partially translucent communication aura 52 to partially surround both Avatars that are associated with the communication session. By unifying the aura around both Avatars other participants in the virtual environment are able to tell that a conversation is occurring.

Figure 9:
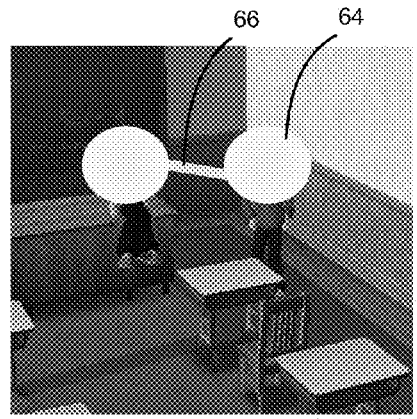

During a conversation, either participant may decide that the conversation should be a private conversation to avoid interruption by other participants. If the conversation is private it may be represented differently to the other participants, for example as shown in FIG. 9. Setting the conversation to private may cause the Avatars may be teleported to a private location/room in the virtual environment where other users can't interrupt them. In FIG. 9, this is represented by superimposing a bubble 64 on each of the Avatars associated with the communication session, and interconnecting the bubbles 64 via a tube 66 to indicate that the two Avatars are engaged in a conversation.

Either participant may terminate a communication session to cause the visual representation of the Avatars to revert back to normal (see e.g. FIG. 3). Where the participants have set their Avatars to automatically connect, and one of the participants has terminated the communication session, the virtual environment server may impose additional restrictions on establishment of a connection between the two participants. For example, assume that Avatars 50A and 50B are within the auto-connect distance, and that the participant associated with Avatar 50A has just disconnected a previous connection. Since the Avatars are technically within the auto-connect distance and both are set to automatically connect, without the additional restriction the virtual environment server may attempt to re-establish the connection. Thus, for example, where a connection is disconnected the virtual environment server may require the Avatars to move away from each other beyond the disconnect distance and then re-approach each other before allowing a new connection to be established. Alternatively, the virtual environment server may impose a time restriction to prevent a new connection from being established between the two users, for example for several seconds. Still alternatively, the virtual environment server may disable the auto-connect mechanism for the particular Avatars that were previously associated with a communication session to require those Avatars to connect manually with each other for a period of time. Other methods of preventing unintended automatic reconnect may be implemented as well.

Figure 10:
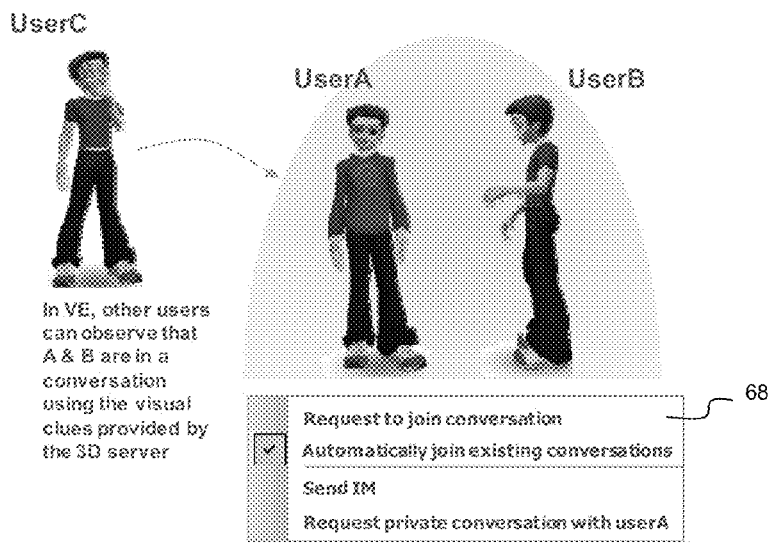
Figure 11:
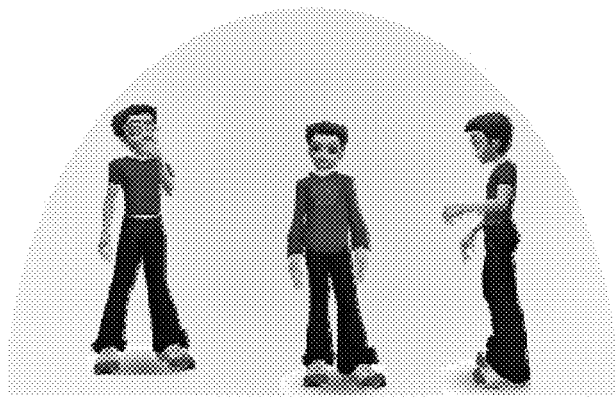

There may be times where a third party may want to join an on-going conversation. An example of this is shown in FIG. 10. Where the participants are all set to automatically connect and automatically allow others to connect, the third participant may join in the conversation. This may be represented to other participants in the virtual environment by showing the aura to also include the third Avatar as shown in FIG. 11.

When the third participant seeks to join an existing conversation, the third participant may indicate that desire to the virtual environment server (e.g. by scrolling over and right clicking on the conversation aura). Optionally, the third participant may be provided with a dialog, such as the dialog box 68 shown in FIG. 10, to enable the third participant to specify how he would like to join the conversation. For example, the third participant may ask to join the on-going conversation, automatically join the existing conversation, send one or more of the participants an Instant Message, or request a private conversation with one of the users. Other options may be available as well.

If the third participant is accepted into the conversation, the existing audio channel is moved to a conference bridge with all three parties. The visual representation of the conversation (aura) is also adjusted to include the Avatar associated with the third participant so that other participants in the virtual environment know that a group conversation is occurring. Other users may join the conversation unless the conversation is set to private by one or more of the participants.

In a multi-party conversation, one user may be allowed to evict another user from the conversation. Alternatively, to prevent one person from dominating and controlling the membership in the conversation, a voting process may be required such that two or more, a majority, or unanimity may be required to evict a participant from a conversation. Once the multi-party conversation has reduced in size such that there are only two remaining participants, then the conference may be moved from the conference bridge to a two-way communication channel.

Figure 12:
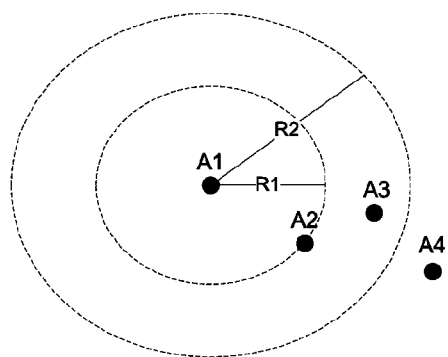
FIGS. 12-19 are schematic diagrams showing how proximity between Avatars in a virtual environment may be used to manage communication between the participants in the virtual environment according to an embodiment of the invention.

FIGS. 12-18 show aspects of how distance may be used, at least in part, to establish and disconnect communications sessions between participants in a virtual environment. FIG. 12 shows a first user (Avatar 1=A1) located in a virtual environment. A connect distance R1 may be established for the Avatar A1 such that another Avatar will need to be within distance R1 of the first Avatar to establish a connection. In the example shown in FIG. 12, Avatar A2 is within R1 of Avatar A1, and thus Avatars A1 and A2 may establish a connection. Where they are set to automatically connect, the connection will be established automatically. Where they are set to manually connect, they may need to choose to establish the session with each other. Although not shown, different radii R1-$a$ and R1-$m$ may be used for establishment of a connection automatically and manually.

Once a connection is established, the participants may continue talking on the connection while their Avatars are proximate each other. To allow some flexibility on how close the Avatars are required to be with each other, a disconnect distance may be specified such that the connection will automatically be terminated once the Avatars move away from each other. This is shown in FIG. 12 as radius R2. Note, in this regard, that radius R2 is somewhat larger than radius R1 to provide hysteresis to the connection. In FIG. 12, if Avatars A3 and A2 have established a communication session, then Avatars A3 and A2 will continue to be able to talk on the connection even though they are further apart than the connection distance, since the distance between the two Avatars has not yet exceeded the disconnect distance R2. Avatar A4, in FIG. 12, would not be allowed to engage in a communication session with Avatar A1, however, since Avatar A4 is outside both the connect and disconnect distances.

Figure 13:
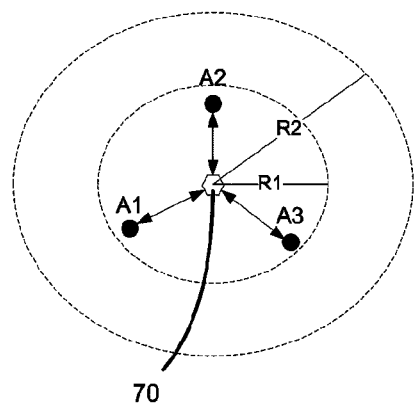
Figure 16:
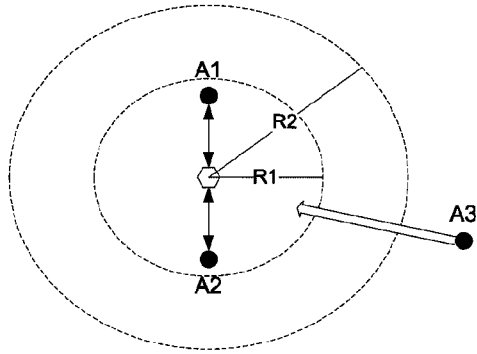

FIG. 13 shows a possible way of calculating connect and disconnect distances where there are multiple parties. As shown in FIG. 13, where there are multiple parties a logical center of the communication session 70 may be established. The logical center of the communication session may be the center of mass of the various participants, and the connect/disconnect distances may be calculated from that point rather than being calculated from the position of any one of the participants. Although FIG. 13 shows the formation of a logical center of mass of the communication system between three parties, this may also be extended to a situation where there are only two parties. An example of this is shown in FIG. 16. In a two party conversation, may the connect distance and disconnect distance may be measured as the distance between the parties or, optionally, may be measured from the center of mass of the conversation.

Referring again to FIG. 13, the logical center may be thought of as a virtual location of a conference bridge between the participants. As the users move relative to each other, the logical center of the conference bridge will move as well to stay at the center of mass of the various participants to the communication session. In this way the logical center will respond to the movements of the Avatars and track the participants. The logical center may be represented in the virtual environment by a dot or other indicia.

Figure 14:
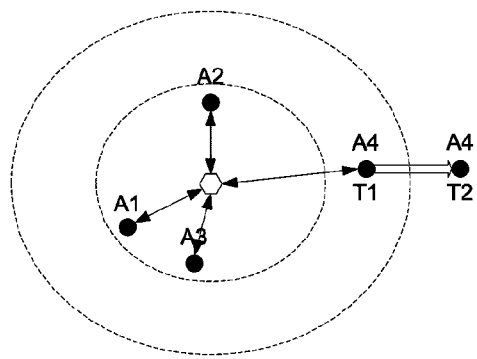

When a user moves more than the disconnect distance away from the logical center of the conversation, the user will be disconnected from the communication session. This is shown in FIG. 14. Specifically, in FIG. 14 Avatar A4 is located initially at time T1 within the disconnect distance from the logical center. At time T2, Avatar A4 has moved outside of the disconnect distance thus causing the participant associated with Avatar A4 to be disconnected from the communication session.

Figure 15:
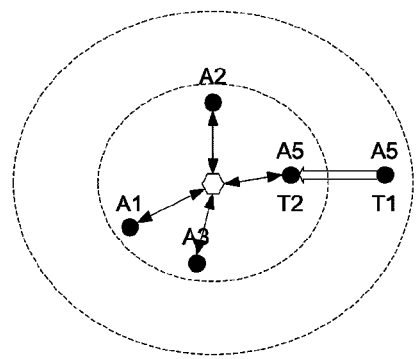

Similarly, if a participant wants to join a communication session, the participant may move their Avatar to get within the connection distance of the logical center of the communication session, e.g. as shown in FIG. 15. Once the Avatar A5 is within the connect distance of the logical center, the Avatar A5 may automatically or manually join the conversation. Since the Avatar A5 is not part of the communication session at time T1, movement of the Avatar A5 toward the conversation will not cause the logical center to move. However, at time T2 once the Avatar A5 has joined the conversation, the location of Avatar A5 will also be used to calculate the logical center of the conversation.

FIG. 16 shows a two person conversation in which a center of mass of the conversation is used to calculate the connect and disconnect distances. The connect and disconnect distances may be calculated for the parties to the conversation, and also for other persons seeking to join the conversation. For example, in FIG. 16, it will be assumed that a conversation is occurring between Avatars A1 and A2. A third Avatar, A3, would like to join the conversation. In one embodiment, the third Avatar may be required to get within a connect distance of the center of mass of the conversation. Alternatively, in another embodiment, the third Avatar may seek to join the conversation if he is within a connect distance of either one or both of the participants. Thus, the system may optionally calculate a center of mass between any set of two or more participants to a conversation and use the center of mass to determine whether to enable another participant to join into the conversation.

The connect distance may change for a given conversation as the number of participants increase. For example, it may be difficult to keep a larger number of Avatars within the disconnect distance than it is to keep two or three people together. Accordingly, the connect/disconnect distance may increase as the number of participants in the conversation grows. Conversely, it may be desirable to reduce the connect distance where there are a large number of people (Avatars) gathered together in a compact manner. For example, if there is a gathering of Avatars, small groups of Avatars may want to have private conversations much like they would at a real-world party. In this instance the connect distance may be set to be rather small to prevent the conversation from being joined by many other Avatars unintentionally. Thus, the connect and disconnect distance may be adjusted based on how populated the virtual environment is, the number of participants, and optionally other factors that may affect how participants would desire to talk with each other.

Figure 17:
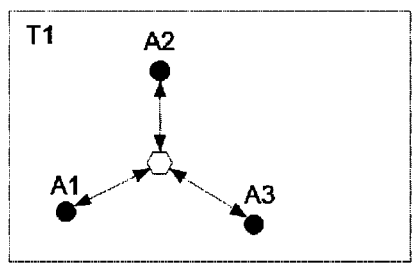
Figure 18:
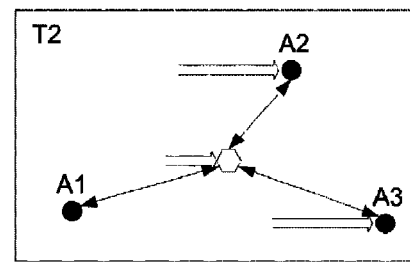

FIGS. 17-18 show how the logical center of the conversation moves as participants to the conversation move relative to each other. As shown in FIG. 17, assume initially at time T1 that three Avatars A1-A3 are engaged in a communication session. The logical center of the communication session will be calculated at the center of mass of the three Avatars. FIG. 18 shows the center of mass of the conversation at time T2. As shown in FIG. 18, as Avatars A2 and A3 move to the left, the center of Mass of the conversation will likewise move to the left. However, since Avatar A1 has not moved, the center of mass of the conversation will move less than the individual movements of either of the Avatars A2, A3.

Where movement of the logical center of the conversation causes an Avatar to be outside the disconnect distance, that Avatar may be disconnected from the conversation.

Figure 19:
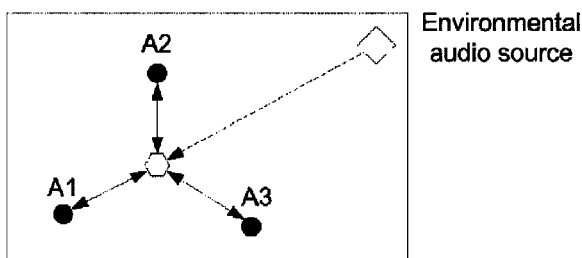

It may be desirable to include background noise in a virtual environment. For example, it may be desirable to include music, crowd noise, noise sources such as the sound of a waterfall or fountain, or other background noise source. FIG. 19 shows an example where an environmental audio source has been included in the virtual environment. The environmental audio may be streamed to each of the participants as the participants engage in the virtual environment. The environmental audio may also be overlayed onto the communication session having a direction which is associated with the direction of the environmental noise source to the logical center of the conversation. The virtual relative position of each source contribution can be tracked and positioned for a given user, for example using a Head Related Transfer Function (HRTF). For example, if Avatar A1 is to the front left relative to Avatar A2, audio from Avatar A1 will be played to Avatar A2 as if coming from the front left.

Optionally, one or more of the participants may have the option of turning off the background noise to make it easier for that participant to hear the conversation. The background noise may be turned off on a participant-by-participant basis, or for the communication session as a whole.

The functions described above may be implemented as one or more sets of program instructions that are stored in a computer readable memory within the network element(s) and executed on one or more processors within the network element(s). However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of managing an audio communication session between a group of participants in a virtual environment, each of the group of participants being represented in the virtual environment by at least one Avatar, the method comprising the steps of:

determining a center of mass of the audio communication session according to locations of the Avatars representing each of the group of participants to the audio communication session within the virtual environment; and causing the center of mass of the audio communication session to adjust according to movement of any of the Avatars representing the group of participants to the audio communication session as the Avatars representing the group of participants to the audio communication session move within the virtual environment;

wherein a connect distance is used to determine whether a new participant may join the audio communication session, the connect distance being calculated as a distance between the center of mass of the audio communication session and an Avatar representing the new participant in the virtual environment; and wherein a participant to the audio communication session may be disconnected from the audio communication session if a distance between an Avatar associated with the participant and the center of mass of the audio communication session exceeds a disconnect distance.

2. The method of claim 1, wherein the center of mass of the audio communication session is determined as a mid-point between the Avatars representing the group of participants to the audio communication session.

3. A method of managing an audio communication session between a group of participants in a virtual environment, each of the group of participants being represented in the virtual environment by at least one Avatar, the method comprising the steps of:

determining a center of mass of the audio communication session according to locations of the Avatars representing each of the group of participants to the audio communication session within the virtual environment; and causing the center of mass of the audio communication session to adjust according to movement of any of the Avatars representing the group of participants to the audio communication session as the Avatars representing the group of participants to the audio communication session move within the virtual environment;

wherein a connect distance is used to determine whether a new participant may join the audio communication session, the connect distance being calculated as a distance between the center of mass of the audio communication session and an Avatar representing the new participant in the virtual environment; and wherein if Avatar representing the new participant is closer than the connect distance to the center of mass of the audio communication session, the new participant is allowed to manually connect to the communication session, and if the new participant is closer than a second connect distance to the center of mass of the audio communication session, the new participant is automatically connected to the communication session.

4. The method of claim 1, wherein a participant to the audio communication session may be disconnected from the audio communication session if a distance between an Avatar associated with the participant and the center of mass of the audio communication session exceeds a disconnect distance.

5. The method of claim 1, wherein if Avatar representing the new participant is closer than the connect distance to the center of mass of the audio communication session, the new participant is automatically connected to the audio communication session.

6. The method of claim 1, wherein if Avatar representing the new participant is closer than the connect distance to the center of mass of the audio communication session, the new participant is allowed to manually connect to the audio communication session.

7. The method of claim 6, wherein the group of participants to the audio communication session may prevent the user from manually connecting to the communication session.

8. The method of claim 3, wherein the group of participants to the audio communication session may prevent the user from manually connecting to the audio communication session.

9. The method of claim 3, wherein the connect distance increases as the number of participants increases.

10. The method of claim 4, wherein if the Avatar representing exceeds the disconnect distance from the center of mass of the audio communication session, the participant represented by the Avatar is automatically disconnected from the audio communication session.

11. The method of claim 1, wherein the disconnect distance is greater than the connect distance.

12. The method of claim 1, wherein the connect distance and disconnect distance increase as the number of participants in the audio communication session increases.

13. The method of claim 1, wherein the connect distance and disconnect distance are adjusted based on how populated the virtual environment is and the number of participants in the group of participants to the audio communication session.

14. The method of claim 1, wherein the audio communication session further comprises directional environmental audio overlayed on the communication session from a virtual environmental audio source in the virtual environment.

15. The method of claim 14, wherein one or more of the participants to the audio communication session can elect to not hear the environmental audio.

16. The method of claim 15, wherein the participants to the audio communication session individually elect whether an audio stream presented to the individual participant will include the environmental audio.

17. The method of claim 1, wherein the center of mass of the audio communication session is a logical center of the communication session and wherein the group of participants includes three or more participants.

18. The method of claim 1, wherein the center of mass of the audio communication session is represented in the virtual environment by a visible dot or other visible indicia.

* * * * *

UNITED STATES PATENT AND TRADEMARK OFFICE
CERTIFICATE OF CORRECTION

| | | |
|---|---|---|
| PATENT NO. | : 8,082,297 B2 | Page 1 of 1 |
| APPLICATION NO. | : 12/916717 | |
| DATED | : December 20, 2011 | |
| INVENTOR(S) | : Dany Sylvain, Nicholas Sauriol and Arn Hyndman | |

It is certified that error appears in the above-identified patent and that said Letters Patent is hereby corrected as shown below:

On the Title Page:
Item (75) Inventors,

"Dany Syvain"

should read:

--Dany Sylvain--.

Signed and Sealed this
Fourteenth Day of February, 2012

David J. Kappos
*Director of the United States Patent and Trademark Office*